R. B. VAN ONNER.
MILL FEEDING APPARATUS.

No. 176,100. Patented April 11, 1876.

UNITED STATES PATENT OFFICE.

ROBERT B. VAN ONNER, OF MIFFLINTOWN, PENNSYLVANIA, ASSIGNOR TO HIMSELF AND JAMES N. VAN ONNER.

IMPROVEMENT IN MILL-FEEDING APPARATUS.

Specification forming part of Letters Patent No. 176,100, dated April 11, 1876; application filed February 28, 1876.

*To all whom it may concern:*

Be it known that I, ROBERT B. VAN ONNER, of Mifflintown, Juniata county, Pennsylvania, have invented a new and Improved Mill-Feeding Apparatus, of which the following is a specification:

My invention consists of a stationary tube, extending down from the hopper a suitable distance, with a revolving disk in the bottom turned by a damsel, which works up and down through it freely as the stone is raised or lowered, so as not to alter the feed, the said tube having openings through the lower part, out of which the feed is thrown by the disk, and having an outside tube on it, which is raised and lowered by a shaft to regulate the feed.

Figure 1:
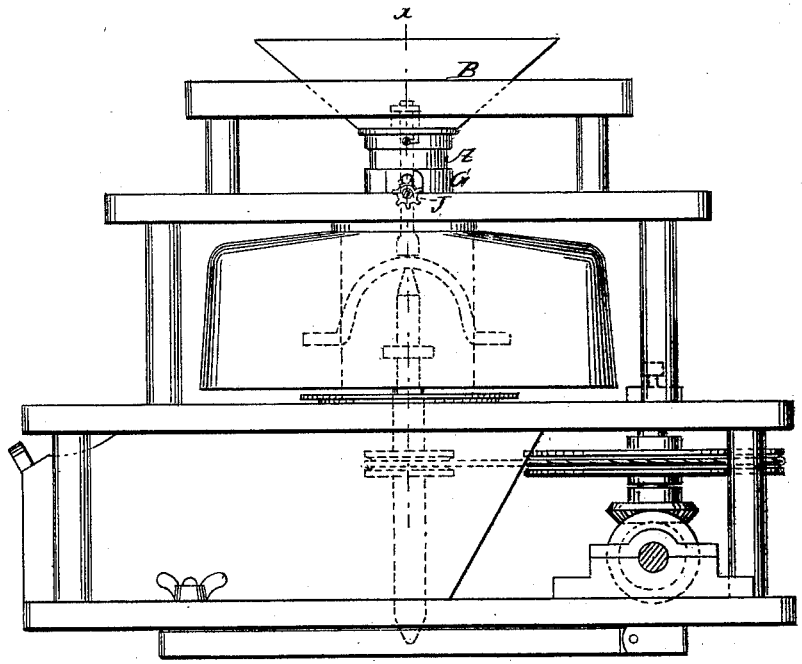
Figure 2:
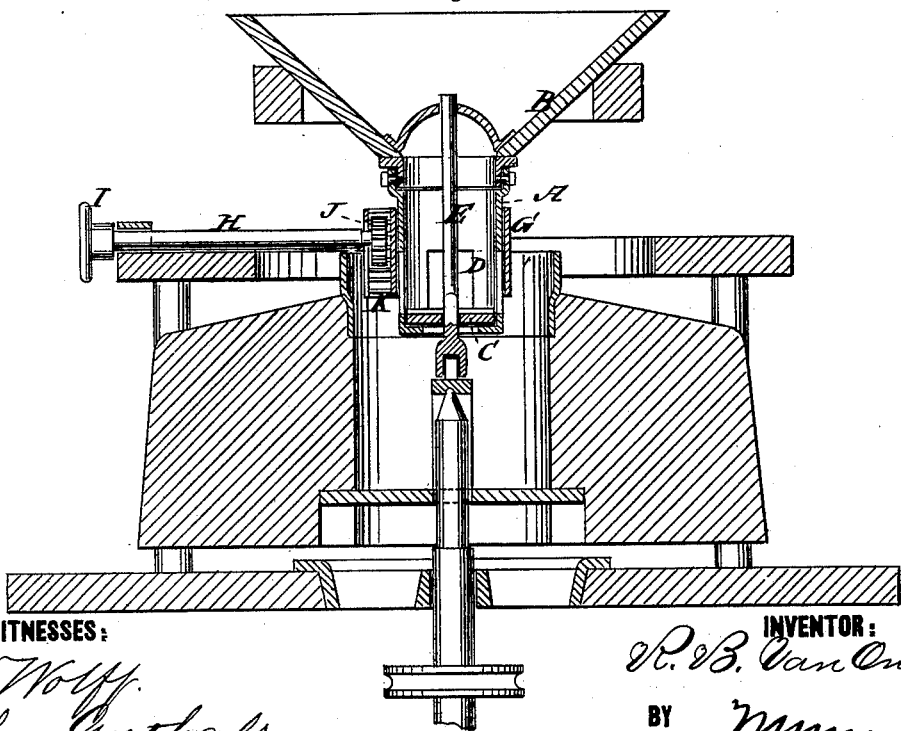

Figure 1 is a side elevation of a mill, with my improved feeding apparatus; and Fig. 2 is a sectional elevation.

Similar letters of reference indicate corresponding parts.

A is the tube, extending down from the hopper B, and having the revolving disk C in the bottom for throwing out the feed through openings D in the lower part of the tube. E is the damsel, which turns the disk. It is fitted so as to slide up and down in the disk freely when the stone is raised or lowered to avoid altering the feed thereby. G is the feed-regulating tube. It is fitted on tube A to slide up and down to partially open and close the openings D, and is worked by the shaft H having a hand-wheel, I, and gearing with the tube by the pinion J and toothed bar K, or in any approved manner.

This improved feed apparatus is more regular and better adapted for feeding middlings and other substances than the ordinary feed contrivances.

Having thus described my invention, I claim as new and desire to secure by Letters Patent—

The combination of stationary tube A, having openings D in the sides of the lower part, rotary disk C in the bottom of said tube, and the vertically-adjusting tube G outside of the tube A, substantially as specified.

ROBERT BURCHFIELD VAN ONNER.

Witnesses:
ELI DUNN,
E. W. H. KREIDER.